United States Patent
Pfaffelhuber et al.

(10) Patent No.: US 7,757,809 B2
(45) Date of Patent: Jul. 20, 2010

(54) ACOUSTIC COVER PART FOR A VEHICLE

(75) Inventors: Klaus Pfaffelhuber, Günzburg (DE); Arno Orth, Hamm (DE); Egon Moos, Neustadt/Weinstraβe (DE); Frank Uhl, Brücken (DE); Ludwig Huber, Durbach (DE)

(73) Assignee: Rochling Automotive AG & Co. KG (DE)

( * ) Notice: Subject to any disclaimer, the term of this patent is extended or adjusted under 35 U.S.C. 154(b) by 108 days.

(21) Appl. No.: 11/667,152

(22) PCT Filed: Nov. 4, 2005

(86) PCT No.: PCT/EP2005/011820

§ 371 (c)(1),
(2), (4) Date: Nov. 15, 2007

(87) PCT Pub. No.: WO2006/048304

PCT Pub. Date: May 11, 2006

(65) Prior Publication Data

US 2008/0067002 A1    Mar. 20, 2008

(30) Foreign Application Priority Data

Nov. 6, 2004    (DE) ..................... 10 2004 053 751

(51) Int. Cl.
- *F02B 77/13* (2006.01)
- *E04B 1/84* (2006.01)
- *E04B 1/82* (2006.01)
- *F02B 77/11* (2006.01)
- *E04B 1/74* (2006.01)

(52) U.S. Cl. ............... 181/290; 181/286; 181/204; 296/39.3; 264/257; 442/401

(58) Field of Classification Search .......... 181/290, 181/291, 294, 286, 204; 296/39.3, 39.1; 264/241, 257; 442/401, 150
See application file for complete search history.

(56) References Cited

U.S. PATENT DOCUMENTS 4,242,398 A * 12/1980 Segawa et al. ............ 428/172

(Continued)

FOREIGN PATENT DOCUMENTS

DE    4334984    1/1995

(Continued)

OTHER PUBLICATIONS

"International Search Report".

(Continued)

*Primary Examiner*—Edgardo San Martin
(74) *Attorney, Agent, or Firm*—Kilpatrick Stockton LLP (57) ABSTRACT

A cover part for a vehicle, especially an underbody cover, has a porous core layer and at least one cover layer on each side, wherein the porous core layer is constructed such that it has acoustic transparency or an acoustically absorbent effect. Here, the porous core layer is made either from a thermoplastic matrix with embedded reinforcement fibers, especially glass fibers, whose melting point temperature is higher than the melting point temperature of the plastic matrix, or from a foam, which is either open-cell or closed-cell and perforated. The acoustically absorbent porous core layer is occupied on one or both sides with one or more acoustically transparent or absorbent covering layers.

24 Claims, 5 Drawing Sheets

U.S. PATENT DOCUMENTS

| | | | | |
|---|---|---|---|---|
| 5,068,001 | A | * | 11/1991 | Haussling .................... 156/222 |
| RE36,323 | E | * | 10/1999 | Thompson et al. .......... 181/286 |
| 6,305,494 | B1 | * | 10/2001 | Pfaffelhuber et al. ....... 181/286 |
| 6,659,223 | B2 | * | 12/2003 | Allison et al. ............... 181/290 |
| 2003/0008581 | A1 | | 1/2003 | Tilton et al. |
| 2004/0090089 | A1 | * | 5/2004 | Byma et al. ................. 296/214 |
| 2004/0256175 | A1 | * | 12/2004 | Gnadig ....................... 181/290 |
| 2005/0217932 | A1 | * | 10/2005 | Woodman et al. ........... 181/290 |

FOREIGN PATENT DOCUMENTS

| | | |
|---|---|---|
| DE | 19652527 | 12/1996 |
| DE | 19804567 | 8/1999 |
| DE | 19904986 | 8/2000 |
| DE | 20203808 | 9/2003 |
| DE | 10311421 | 9/2004 |
| EP | 0531761 | 3/1993 |
| EP | 0732684 | 9/1996 |
| EP | 1308271 | 5/2003 |
| EP | 1362744 | 11/2003 |
| FR | 2387822 | 4/1977 |
| JP | 2001098449 | 4/2001 |
| WO | WO-94/11222 | 5/1994 |
| WO | WO-9616804 | 6/1996 |
| WO | WO-9944816 | 9/1999 |
| WO | WO-2005/025858 | 3/2005 |

OTHER PUBLICATIONS

"International Search Report", Jan. 25, 2007.

* cited by examiner

ACOUSTIC COVER PART FOR A VEHICLE

This application is a national stage application that claims priority under 35 U.S.C. §§365 and 371 to PCT/EP05/11820, filed Nov. 4, 2005, which claims priority to DE 10 2004 053 751.8, filed Nov. 6, 2004.

FIELD OF THE INVENTION

The invention relates to a cover part for a vehicle and especially to an engine compartment part or underbody cover part for a motor vehicle, which shall be used as the basis for examples below.

BACKGROUND OF THE INVENTION

It is known to form underbody covers or engine compartment covers from glass fiber-reinforced plastics in a forming method with high internal mold pressures. The glass-fiber reinforcement typically consists of woven mats or nonwoven mats, but also from bulk glass fibers, which are, however, as non-oriented as possible and which are introduced into a plastic matrix predominantly of polypropylene. The semifinished products made available in this way are usually plates made from glass fiber-reinforced thermoplastic (GMT) or rod-shaped granulate (LFT: long fiber thermoplastic). The rod-shaped granulate is composed of a glass fiber filament bundle of approximately 20 mm length, which is enclosed by a polypropylene shell. Before molding, the plates are heated in a furnace or the LFT granulate is melted in a plastifying unit, in order to then be placed in the open mold of the press.

Meanwhile, it is also typical to process the glass fibers in a direct draw-in process together with plastic granulate in a plastifying unit (D-LFT), without having to pass through the intermediate step of an LFT semifinished product. For increased temperature requirements, it is also typical to use as the plastic matrix a glass fiber-reinforced duroplastic material made from polyester resin, which fully cures in a heated die (SMC: sheet molded compound).

The resulting components typically have a thickness of approximately 1.5-2.5 mm and a basis weight of approximately 2 kg/m$^2$. The maximum component size currently possible is approximately 1.0 to 1.5 m$^2$, due to the very high molding pressures of approximately 200-300 bar and the associated high machine costs for presses with a pressing force of more than 3000 t.

New production methods allow the production of lighter-weight and larger surface-area components with significantly lower molding pressures. Here, a nonwoven mat made from glass fibers and plastic fibers, e.g., polypropylene or polyester, is created as a semifinished product and is covered on both sides with two plastic cover films, e.g., also polypropylene (LWRT: low weight reinforced thermoplastic). The core layer of this composite has the property of expanding (lofting) under heating. With this material lofted to a total thickness of approximately 10 mm, the edge region can be pressed compact (completely consolidated) through a suitable die shape, while the structure of the nonwoven core with the cover films can be maintained in the remaining region. This structure leads to very inherently stiff components with a relatively low basis weight of below 1.5 kg/m$^2$. Because in this method the die cavity does not have to be formed by a flowing mass, significantly smaller molding pressures (approximately 10 bar) are produced and it is possible to mold with clamping surfaces of 4 m$^2$ and more without additional measures. A disadvantage in this method is that structures for reinforcing or required for additional functionality, such as connecting pieces, NACA openings, attachment domes, etc., can be attached only to a limited extent, if at all. Newer developments in the field of LWRT have foam as the core layer and a glass fiber-reinforced PP nonwoven as the cover layer. Here, further weight reduction is possible for a comparable stiffness.

It is further known to provide these engine compartment shields and underbody covers on the side facing the engine or the exhaust installation with heat shields and sound absorbers.

Sound absorbers usually consist of coated PUR foam or coated polyester nonwoven, but also of deep-drawn chamber structures or microperforated films and plates. Typically, such sound absorption molded parts are later bonded, clipped, or fused onto the engine compartment shielding. However, it is also known to produce a complete noise enclosure, that is, a support and compartment absorber, in a blow-molding method in one processing step. However, based on the process, this creates a considerable restriction on the material selection of the support and absorber and thus also on the physical properties, especially as concerns glass-fiber reinforcement of this component and its properties with reference to stiffness, strength, and impact resistance.

Heat shields are composed of prefabricated aluminum, which is clipped on or fused on by means of a special connection layer. The fusing and shaping of fusible aluminum in the die is also known.

Recently, the combination of sound absorption and heat insulation in the form of aluminum membrane absorbers and microperforated aluminum films has also become known.

It is further known to produce wheel-well covers from nonwovens or combinations of nonwovens and films. Nonwoven variants have advantages in terms of production costs and component weight compared with injection-molded wheel well covers. In particular, it has been shown that this nonwoven has a favorable acoustic effect against noises from splashed water and stone impacts.

Recently, production has moved towards attaching nonwoven also on the road-surface side of the underbody covers and noise enclosure. Here, it has been shown that the noise from the engine, gearing, and exhaust installation is reduced by this street-side lining and then even when the underbody has already been closed completely by a noise enclosure. To take full advantage of the potential, the nonwoven thickness should be significantly greater than the current typical nonwoven thickness layers of approximately 1 mm.

SUMMARY OF EMBODIMENTS OF THE INVENTION

The invention described here is based on the task of creating a cover part for a vehicle, especially for the underbody, cover noise enclosure cover, or wheel well cover that integrates the properties of the systems described above for acoustic and heat insulation while maintaining the stiffness, impact resistance, and elastic modulus properties of the glass fiber-reinforced components.

According to the invention, the components of glass fiber-reinforced support plates, sound absorbers, heat insulators, nonwoven linings, etc., are no longer separated in their functional arrangement and in their successive production. The properties are combined in a single material or layer arrangement, wherein in a single shaping process an engine compartment cover, an underbody cover, a wheel well, or other inherently stiff components are produced from such a material composite. This results in clear cost reductions compared with most well known multiple-step production methods.

Finally, with respect to current developments for always using increasingly larger surface-area components in the underbody region, an advantageous method requires no compromises in this respect and allows, for example, the production of a completely closed underbody assembly made from a single large plate.

The method according to the invention offers the prerequisites for creating components having all of the properties named above, wherein both the production is simplified and thus less expensive and also the functional properties can be maintained or even increased.

The basic idea of the invention is to combine a porous core layer with acoustically transparent or absorbent cover layers such that both the mechanical properties of classic support materials and also the acoustic properties of classic absorbers are realized. Thus, the support itself becomes an absorber and contributes with its material strength to the effective acoustic total thickness of the component. However, the effective acoustic surface is also increased, because now the areas that were not previously equipped with additional absorbers due to installation space are now also acoustically active. Additional absorbers to be attached at a later time are no longer necessary.

The low-pressure molding process necessary for processing porous materials has the result that all of the material components can be shaped and connected in one step.

The technical aspect concerning the method lies especially in that through the low-pressure process in the LWRT production, the effective acoustic and thermal layers are shaped and connected together with the LWRT core in a one-step process.

Advantages compared with the state of the art are:

No separate shaping and stamping of the support necessary;

No separate shaping and stamping of the absorber or heat-protection aluminum film necessary;

No separate connection of the absorber or heat-protection aluminum film with the support necessary.

A nonwoven pressed at the same time maintains to a large degree its original thickness and thus its acoustic performance.

One aspect concerning the component lies in that, through suitable selection and shaping of the cover layers of the LWRT core layer (glass fiber PP core layer or the porous foam layer), the core layer is used simultaneously as an effective acoustic air volume and thus the effective acoustic total thickness of the component grows by the core layer thickness.

Open-celled, porous materials, such as foams and nonwovens, are acoustically absorbent if their flow resistance assumes certain parameters. For nonwovens, the setting of this flow resistance is typically realized by suitable compaction of the fibers. The PP glass fiber mixture of an LWRT core can also be compressed suitably and thus allows this acoustic adjustability, wherein the reinforcing properties of the bound glass-fiber structure are maintained.

According to the invention, the cover layers of the porous glass fiber PP core layer or the porous foam layer have an acoustic transparency or even inherent absorbent effect. Furthermore, the core layer can be adjusted in its acoustic effect through suitable dimensioning of the fibers and the fiber density or the foam structure, wherein the flow resistance of the core layer determines the acoustic tuning of this layer. The dimensioning of the longitudinal flow resistance $\Xi$ at a given layer thickness and required lower limit frequency is described in "Technical Noise Protection" by Werner Schirmer (VDI Verlag ISBN 3-540-62128-8). There, it is recommended that the optimum adaptation occurs at $\Xi_{opt}d=800$ to $2400$ Ns/m$^3$. However, this is not absolutely necessary for a good acoustic design of the total system, because the total acoustics can also be decisively influenced by means of a good design of the cover layers.

An open-celled, porous absorber has a nearly straight-line increase in the sound absorption from 0 to 100% for an optimum flow resistance ($\Xi_{opt}d=800$ to $2400$ Ns/m$^3$) with increasing frequency, in order to block oscillations at a level close to 100% for an additional increase in frequency. The relationship between the thickness d of the porous absorber and the first frequency of the 100% maximum is approximately given by the relationship $f=c*N/(4*d)$; $N=1, 3, 5$ (c: speed of propagation in air). This follows from the fact that a porous absorber has absorption maximum values, where an oscillation at a ¼, ¾, 5/4 wavelength, etc., passes into the absorber or, in other words, where the sound particle velocity has an antinode at the absorber surface.

BRIEF DESCRIPTION OF THE DRAWINGS

In the enclosed figures, embodiments of the invention are described. Shown are.

DETAILED DESCRIPTION OF EMBODIMENTS OF THE INVENTION

However, closed-pore foams also exhibit acoustic absorption properties when the pores reach a certain size and the cell walls are elastic. In this case, the core acts acoustically as a series circuit of small membranes. Also, closed-cell foam can be perforated or pierced by needles, which contributes to a further increase in the sound absorption property. Useful material thickness values for the core layer lie between 1 mm and 20 mm and especially between 1.5 mm and 10 mm, independent of whether a nonwoven or a foam material is used as the core layer.

The acoustic transparency of the cover layers is achieved, on the one hand, through perforations. In the case of hole area ratios >30%, transparency is achieved to a large extent. For hole area ratios under 10%, the film obtains inherent damping properties and thus absorption properties, if the hole sizes here lie between 0.01 and 1 mm, preferably between 0.05 and 0.2 mm.

On the other hand, if one uses a nonwoven as the cover layer, then the transparency or absorbent property can also be set by means of its longitudinal flow resistance $\Xi$.

Finally, acoustic transparency can also be realized by a thin film, wherein this film might not be integrated rigidly into the core structure. One solution is to use foam film, like that also used in common chamber absorbers or to bind the cover film only partially to the core through the formation of chambers in the shaping process (by means of vacuum forming or blow molding). In the case of the foam film, commercially available PP foams can be used, e.g., Alveolen NPFRG 2905.5 made by Alveo or Procell-P 150-2.5 SF40 made by Polymer-Tec. In the case of compact films, common films of 0.1-0.8 mm are suitable if the bond to the core is broken through the chamber formation or films <100 µm if the film is in a direct bond to the core material. In the case of a cover with films or foams, a resonance absorber is produced whose resonance frequency is calculated approximately from the damped air stiffness and the mass of the cover film with fres=1/2PI* (surface stiffness/surface mass) with surface stiffness=rho*c²/d (with rho=air density; c=speed of sound; d=thickness of the film). Here, one also sees that the thickness of the air layer determines for the lower limit frequency.

The material thickness of the cover layers for compact films should lie between 20 µm and 500 µm and especially between 20 µm and 100 µm, for foam films between 1 mm and 8 mm and especially between 2 mm and 6 mm, and for nonwovens it should lie between 0.5 mm and 5 mm and especially between 1 mm and 3 mm.

For at least one cover layer or for both cover layers, a fiber nonwoven reinforced with fibers, especially with glass fibers, can be used, and is preferably composed of 60 wt % to 80 wt % thermoplastic fibers, for example, PP fibers, and from 20 wt % to 40 wt % reinforcement fibers, for example, glass fibers. In the preferred construction, the nonwoven of the cover layer is constructed with a basis weight of 400 g/m² to 500 g/m² from approximately 75 wt % PP fibers and 25 wt % glass fibers.

To prevent the glass fibers from projecting past the outside, another thin PET-fiber nonwoven cover with a basis weight of 15 g/m² to 50 g/m² can be arranged on the cover layer or cover layers.

In this connection, a fiber nonwoven with approximately 60 wt % PP fibers and approximately 40 wt % glass fibers has proven effective as the core layer, which has a basis weight of 400 g/m² to 1200 g/m² and especially of 500 g/m² to 700 g/m².

The production of a component is realized preferably in that the semifinished product, which consists of one or more layers of films, foams, and nonwovens, is heated in a contact or radiant heater and then molded in a cooling die. Layers not subjected to the heating process, for example, the covering nonwovens or the aluminum films for radiant heating, are introduced directly into the die and molded together with the heated core material. It is also conceivable to feed all of the layers separately and to connect them while suitably preheated for the first time in the die. Thus, the creation of a semifinished product can be eliminated, which in turn results in cost savings.

In a preferred construction of the invention, for example, an LWRT semifinished product, which is made from a reinforced glass-fiber PP core nonwoven and covered with two stabilizing films, is modified so that, on the one hand, the glass fiber PP core nonwoven develops acoustic potential in its structure and the cover layers achieve functionality that goes beyond the pure covering and reinforcing functions.

For such an underbody cover made from a porous core layer and at least one cover layer on each side, the cover film can vibrate like a membrane, for example, everywhere or in some regions, wherein the membrane-like vibration of the cover film can be achieved through material selection of an especially elastic film. Plastic films made from PP, PET, PA, PU, etc., with a thickness <100 µm are in this sense fundamentally elastic without requiring special softening additives.

For an inherently stable, acoustically absorbent component or molded part, the membrane-like vibration can be achieved in that the bonding to the core material is broken in some areas. This can be realized, for example, in that the film or foam film is drawn with vacuum into chamber cavities of the die before the die halves are brought together or is pressed away from the core layer again by a vacuum or compressed air after the halves are brought together.

In the method for producing an inherently stable, acoustically absorbent underbody cover, the covering layers can be made from high-melting-point and low-melting-point fibers and thus the fiber structure of the high-melting-point fibers is maintained despite the heating, while the low-melting-point fibers are used as bonding fibers. Alternatively, instead of the fibers, composite films made from high-melting-point and low-melting-point films can also be used.

In the method for producing an inherently stable, acoustically absorbent underbody cover, as the covering layer, a high-melting-point film, e.g., an aluminum film, with a core material-side low-melting-point thermoplastic layer or bonding agent layer can be brought into the die and molded together with the heated core material and in this way, the adhesive layer is activated, which finally leads to a bond between the core material and the high-melting-point film.

Instead of aluminum, high-melting-point plastic films made from PA, PET, and PUR can be used. Examples are: polyamide film 20-50 µm, polyester film 20-50 µm, polyurethane film 20-50 µm, each with a thin one-sided or two-sided adhesive or thermoplastic layer, for example, made from polypropylene, which can be used as a low-melting-point bonding layer. The polypropylene melts while the actual cover film survives the heating or sealing without melting. This is especially advantageous for the use of microperforated films, because, according to experience, the hole sizes change during heating.

In general, the cover layers can be made both from high and low-melting-point fiber mixtures and also from high- and low-melting-point film combinations, wherein for the films, the low-melting-point layers can also be applied to both sides if another outer layer is to be pressed on simultaneously.

According to the invention, the covering layers can be applied partially only in the regions of the component, where they are required for functional reasons. The partial application of the covering layers can be realized in that the covering layers are connected to the core material only in some regions. In one possible construction, the covering film is connected to the core material only in some regions through partial heating, partial ultrasonic welding, partial high frequency welding, or partial friction welding. Alternatively, it is also possible for the covering film, which has a high-melting-point layer and a core-side low-melting-point layer, to be heated to a temperature that causes only the low-melting-point layer to melt, and then to be pressed onto the core from the side facing away from the core material and in this way to be partially attached to this core. The low-melting-point layer can here extend past the entire high-melting-point layer, but it is also possible for the core-side, low-melting-point layer to be arranged in only some regions of the high-melting-point layer.

For the inherently stable, acoustically absorbent underbody cover, the core material can be made from PP foam film or from PUR foam. PP foam is typically closed-cell, but could also be modified by perforations or the application of stamps, such that a comparable effect to the fiber core layers is also produced. The perforation parameters should be selected similar to the microperforated cover layers, such that the hole diameter or the slit width lies between 0.01 mm and 1 mm, preferably between 0.05 mm and 0.2 mm, and the ratio of hole area to total area lies in the range between 0.1% and 10%, preferably between 3% and 8%. Surprisingly, it has been shown that even for only surface perforations, i.e., without piercing the layer, a considerable acoustic effect is produced. The stamps and the intermediate connecting pieces should move in the range from 5 to 50 mm with round, square, or honeycomb geometry. Another advantage is weight reduction.

Figure 1A:
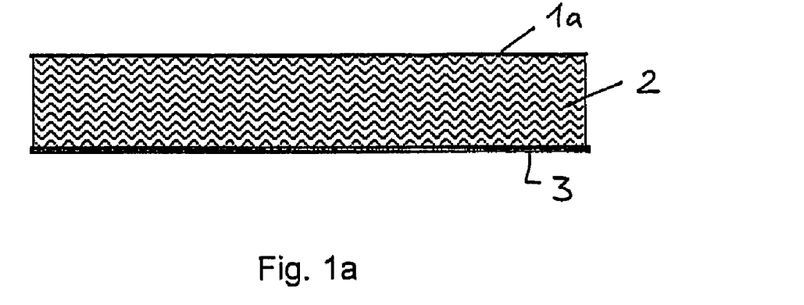
FIGS. 1a, 1b, 1c, known constructions of a cover part.
Figure 1B:
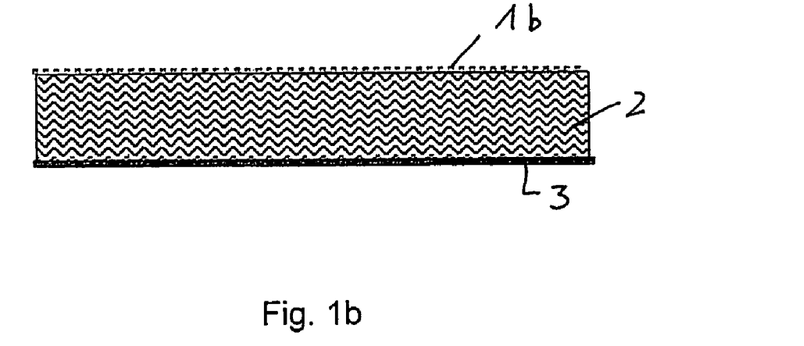
Figure 1C:
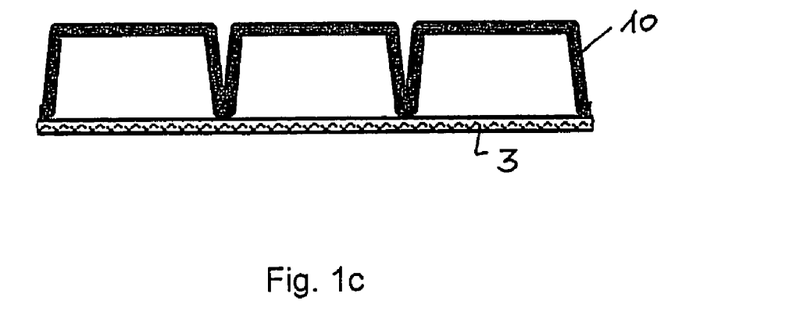

FIGS. 1a, 1b, and 1c show various known noise enclosure systems currently in use made from a cover plate made from, e.g., GMT, D-LFT, or LWRT, and additionally installed sound absorbers.

In FIG. 1a, a porous absorber 2 made from, for example, a polyester nonwoven or a PUR foam is shown schematically, which is covered with a thin PUR or polyester film 1a against fluid media and is applied on a support 3 made from, for example, GMT.

In FIG. 1b, a porous absorber 2 made from, for example, basalt stone wool, is shown schematically, which is covered with a microperforated aluminum film 1b and which is applied on a support 3 made from, for example, SMC.

In FIG. 1c, a chamber absorber 10 made from PP foam is shown schematically, which is applied on a support 3 made from, for example, LWRT.

Figure 2A:
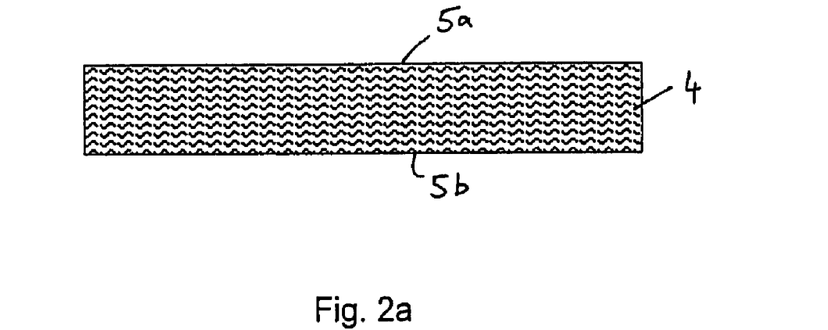
FIGS. 2a, 2b, 2c, constructions according to the invention for a cover part.
Figure 2B:
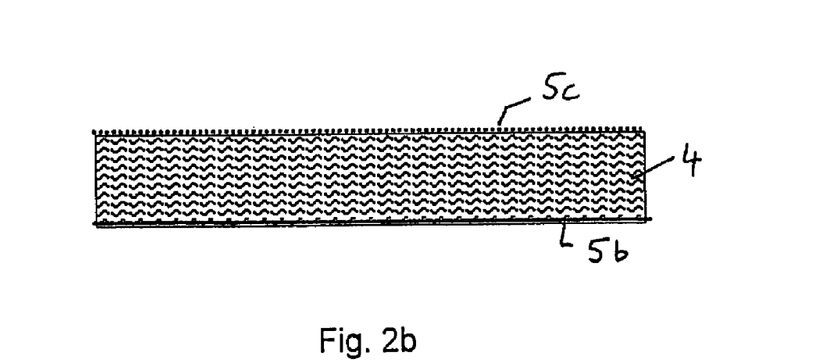
Figure 2C:
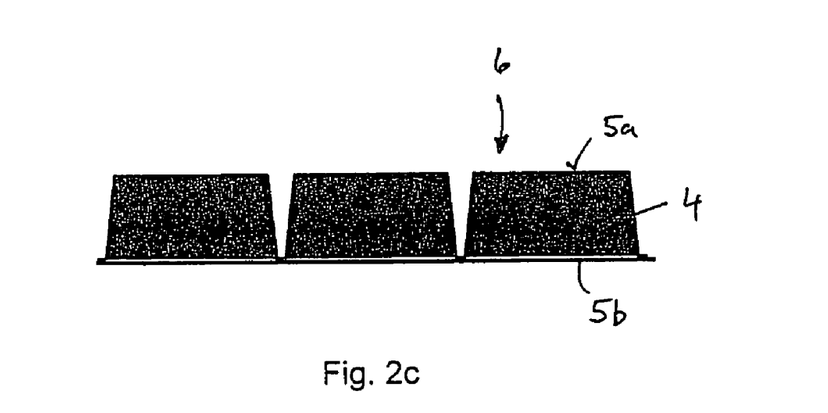

FIGS. 2a, 2b, and 2c show embodiments according to the invention analogous to FIGS. 1a, 1b, and 1c, in which the functionality of the acoustics were transferred into the LWRT core.

In FIG. 2a, an acoustically active glass fiber PP core layer 4 is enclosed between two cover layers 5a and 5b made from film. The core layer 4 with a basis weight of 1200 g/m² has a thickness of 5 mm and is composed of 40 weight percent glass fiber with 15-20 μm fiber diameter and 60 weight percent PP, which is melted and binds the glass fibers. The films have a more or less pronounced acoustic function according to the bending properties and bonding to the glass fiber PP core 4.

In FIG. 2b, the acoustically active glass fiber PP core layer 4 is covered on the top side with a 100 μm thick microperforated film, for example, made from aluminum 5c. This is acoustically absorbent with, for example, a hole diameter of 100 μm and a hole spacing of 500 μm. The aluminum material allows this cover part also to be attached in the immediate vicinity of the exhaust line of the vehicle and thus also allows a closed underbody.

In FIG. 2c, the total construction of the cover films 5a and 5b and the glass-fiber PP core layer 4 is molded into a chamber structure 6. The chamber side surfaces form a square with side lengths from 10 to 100 mm and the height of the chamber lies in the range from 5 to 30 mm, wherein the ratio of side length to height should be approximately 1 to 2. The chambers expand the acoustic adjustability of the component by means of the chamber geometry (resonator effect) and also allow additional stiffening or relaxing of the entire component according to the geometry and arrangement of the chambers.

Additional embodiments of the invention are shown in FIGS. 3a to 3f.

Figure 3A:
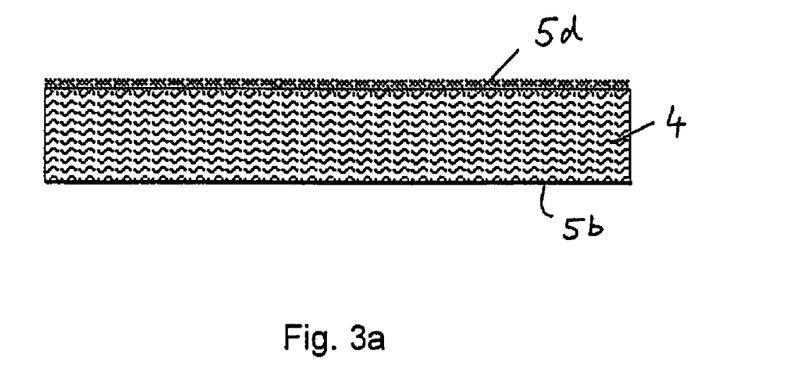
FIGS. 3a, 3b, 3c, 3d, 3e, 3f, additional constructions according to the invention for a cover part, and FIG. 4, a schematic representation of the method for producing a cover part.

In FIG. 3a, the LWRT core layer 4 is covered with a foam film 5d, e.g., Alveolen NPFRG 2905.5 made by Alveo or Procell-P 150-2.5 SF40 made by Polymer-Tec.

Figure 3B:
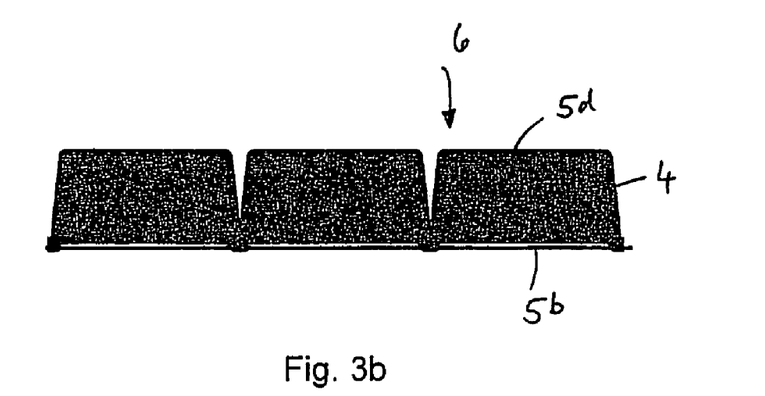

FIG. 3b shows the same material construction, wherein here additional chambers 6 are inserted into the component.

Figure 3C:
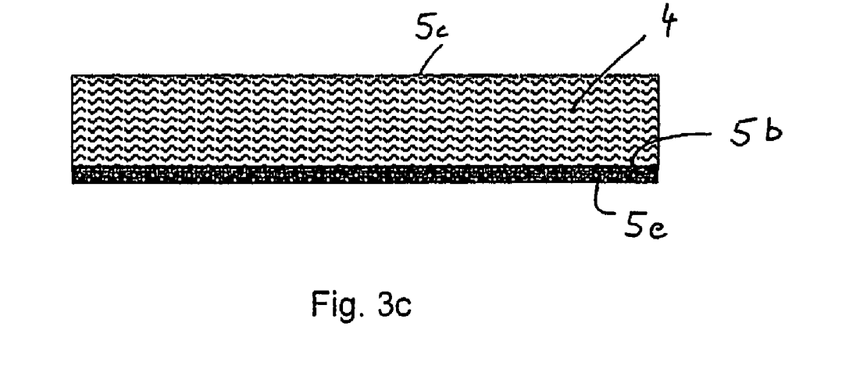

In FIG. 3c, the bottom side of the component is covered with a film 5b and a 2 mm thick acoustically active PP nonwoven 5e with a basis weight of 500 g/m². The top side 5a has a cover made from aluminum film 5c for thermal shielding against the temperatures of the exhaust line.

Figure 3D:
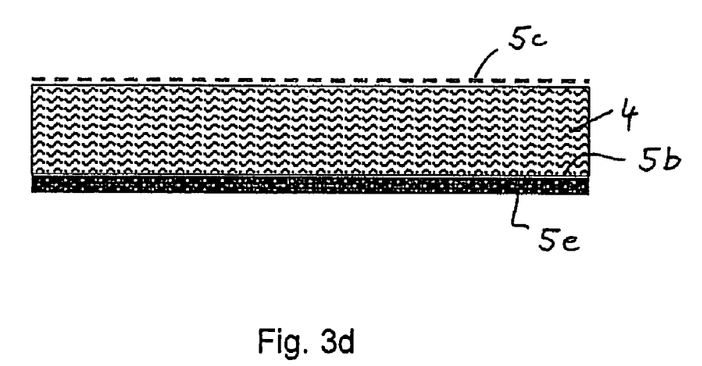

In FIG. 3d, the bottom side of the component is also covered with a film 5b and an acoustically active nonwoven 5e. The 0.05 mm thick aluminum film 5c of the top side is microperforated with a hole diameter of 0.2 mm and a hole spacing of 1.5 mm, which significantly increases the acoustic effect of the component even more.

Figure 3E:
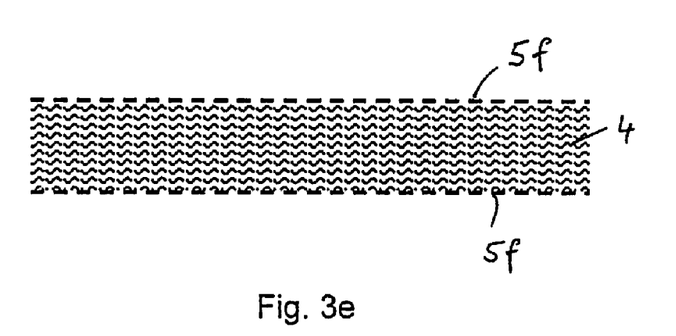

In FIG. 3e, the top side and the bottom side of the component are covered with a microperforated film 5f.

Figure 3F:
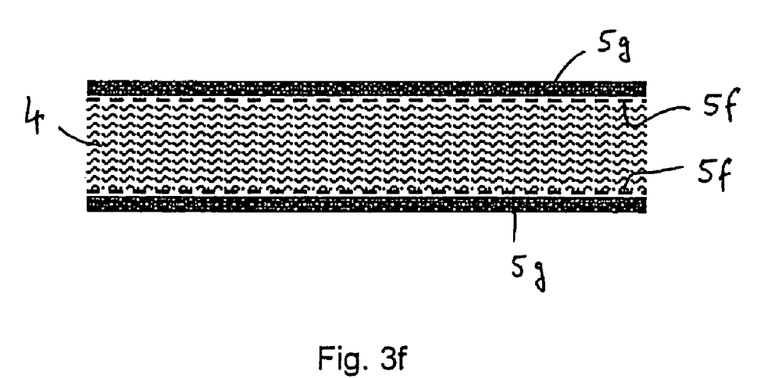

In FIG. 3f, the top side and the bottom side of the component are covered with a 0.05 mm thick microperforated film 5f with a hole diameter of 0.2 mm and a hole spacing of 1.5 mm and these are each covered again with an acoustically active nonwoven 5g. This embodiment has the advantage that the nonwovens 5f are active at a high frequency and the core layer can be tuned in medium and low frequencies together with the microperforated covers. With suitable oleophobic and hydrophobic construction of the nonwovens, this has the effect that, e.g., splashed water cannot penetrate into the perforations and thus into the core material.

Naturally, other embodiments are also conceivable and useful according to the requirements on the acoustic and thermal function of the component. In particular, it is also useful to provide cover layers or their structuring in chambers, etc., only partially.

Figure 4:
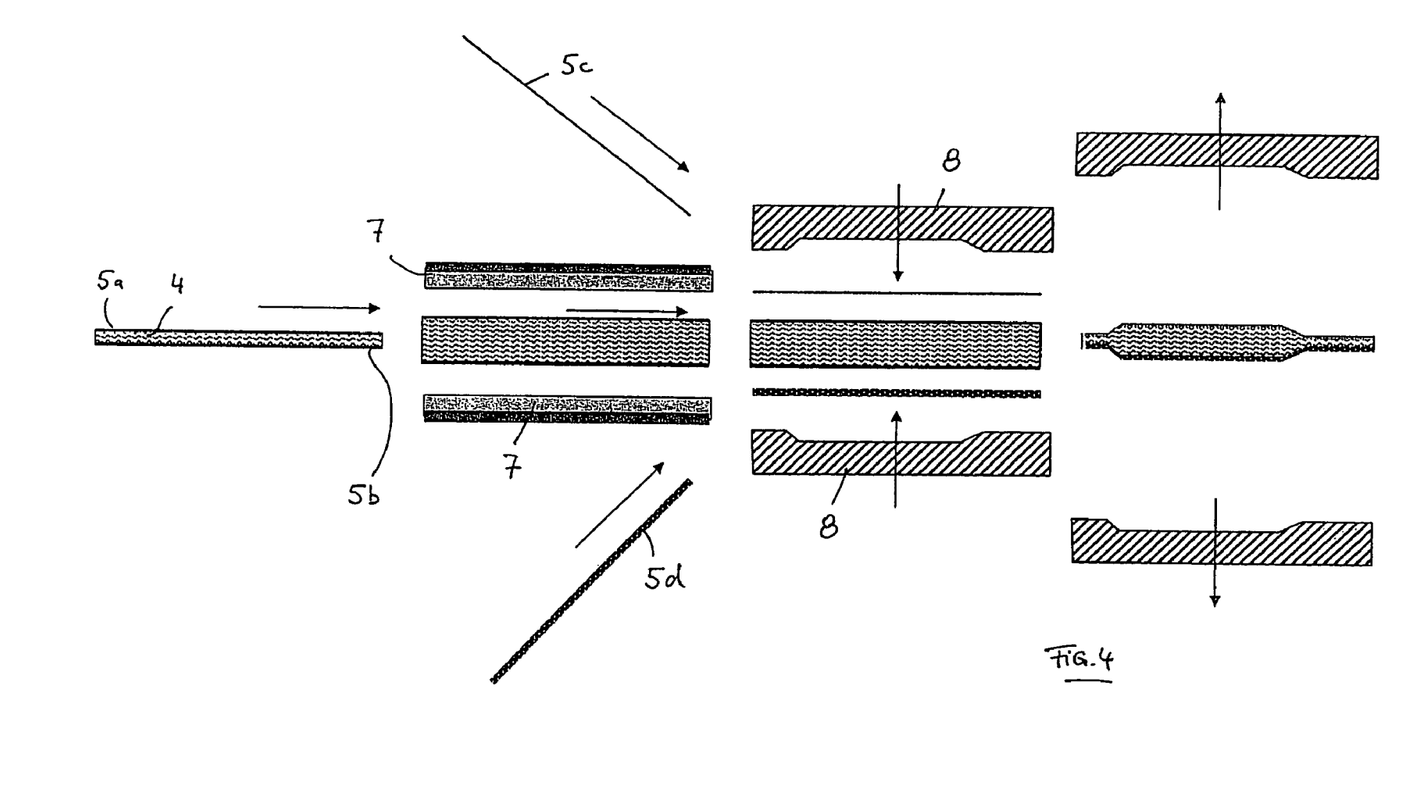

FIG. 4 shows the production method, wherein the core layer 4 with possible cover films 5a, 5b is heated in a radiant heater or contact heater 7 and in this way the core layer is lofted. This lofted material is then inserted and molded in a press die 8 with other non-preheated cover layers 5c and 5d.

Finally, the goal is to build components with the largest possible surface area, because on the one hand, the absorption increases proportionally with the surface area, and, on the other hand, the degree of closure of the underbody increases due to the large surface area, and thus the output of sound is also prevented. Both effects lead to over-proportioned improvement of the outside noise. Such underbody covers can be produced economically with the described component concept and the preceding production method, with which novel possibilities in the acoustic and aerodynamic shaping of vehicles is produced.

The invention claimed is:

1. Cover part for a vehicle comprising a porous core layer and at least one cover layer on each side, wherein the porous core layer comprises a thermoplastic matrix with embedded reinforcing fibers whose melting point temperature is higher than the melting point temperature of the plastic matrix, and wherein at least one of the cover layers comprises a fibrous nonwoven covering material having a glass-fiber component;

wherein the glass-fiber component imparts stiffness-forming properties on the fibrous nonwoven covering material;

wherein the fibrous nonwoven covering material in the at least one cover layer includes high melting point and low melting point fibers; and wherein the melting point temperature of the high melting point fibers is higher than the melting point of the low melting point fibers such that the high melting point fibers provide fiber structure to the cover part and the low melting point fibers act as bonding fibers for the cover part.

2. Cover part for a vehicle comprising a porous core layer and at least one cover layer on each side, wherein the porous core layer comprises open-cell foam or closed-cell and perforated foam, and wherein at least one of the cover layers comprises a fibrous nonwoven covering material having a glass-fiber component;

wherein the glass-fiber component imparts stiffness-forming properties on the fibrous nonwoven covering material;

wherein the fibrous nonwoven covering material in the at least one cover layer includes high melting point and low melting point fibers; and wherein the melting point temperature of the high melting point fibers is higher than the melting point of the low melting point fibers such that the high melting point fibers provide fiber structure to the cover part and the low melting point fibers act as bonding fibers for the cover part.

3. The cover part of claim 1, wherein at least one of the cover layers comprises film material.

4. The cover part of claim 3, wherein at least one of the cover layers are formed from compact film material having a thickness of between 20 μm and 500 μm.

5. The cover part of claim 1, wherein the thickness of the fibrous nonwoven covering material is between 0.5 mm and 5 mm.

6. The cover part of claim 1, wherein the fibrous nonwoven covering material has oleophobic and hydrophobic properties.

7. The cover part of claim 3, wherein the at least one of the cover layers is microperforated.

8. The cover part of claim 7, wherein the microperforation has hole diameters or slit widths of 0.001 mm to 1 mm and hole percentages of 0.1 to 10%.

9. The cover part of claim 3, wherein the at least one of the cover layers is configured and adapted to vibrate like a membrane at least in some regions.

10. The cover part of claim 9, wherein the film material is elastic, and the elastic film material causes the membrane-like vibration of the at least one of the cover layers.

11. The cover part of claim 9, wherein the at least one of the cover layers is bonded to the core layer and wherein the bonding is at least partially broken, and wherein the at least partially broken bonding causes the membrane-like vibration.

12. The cover part of claim 1, wherein the cover part comprises impressions of differing depths which determine its mechanical, dynamic and acoustic properties.

13. The cover part of claim 12, wherein the impressions comprise rectangular or square chamber structures.

14. The cover part of claim 12, wherein the impressions comprise honeycomb chamber structures.

15. The cover part of claim 12, wherein the impressions comprise connecting piece and tube-shaped longitudinal and transverse structures.

16. The cover part of claim 1, wherein the core layer is formed from a nonwoven glass fiber plastic material.

17. The cover part of claim 16, wherein the plastic matrix of the nonwoven glass fiber plastic material is formed from polypropylene.

18. The cover part of claim 16, wherein the plastic matrix of the nonwoven glass fiber plastic material is formed from polypropylene fibers.

19. The cover part of claim 2, wherein the core layer is formed by a closed-cell foam which is opened at least partially through perforation.

20. The cover part of claim 19, wherein the perforation has hole diameters or slit widths of 0.001 mm to 1 mm and hole percentages of 0.1 to 10%.

21. The cover part of claim 1, wherein the core layer has a thickness of 0.5 mm to 20 mm.

22. The cover part of claim 1, further comprising a covering layer comprising a high melting point plastic film and a low melting point thermoplastic layer or bonding agent layer.

23. The cover part of claim 22, wherein the plastic film is microperforated.

24. The cover part of claim 1, further comprising a covering layer at least partially connected to the core layer.

* * * * *